(12) United States Patent
Inoue et al.

(10) Patent No.: US 7,803,039 B2
(45) Date of Patent: Sep. 28, 2010

(54) METHOD OF CONTROLLING AIR INTAKE INTO AIR CONDITIONED ENCLOSURE

(75) Inventors: Eiji Inoue, Farmington Hills, MI (US); Akira Umehara, Toyota (JP); Makoto Sakamaki, Obu (JP)

(73) Assignees: Denso Corporation, Kariya (JP); DENSO International America, Inc., Southfield, MI (US)

( * ) Notice: Subject to any disclaimer, the term of this patent is extended or adjusted under 35 U.S.C. 154(b) by 1823 days.

(21) Appl. No.: 10/872,149

(22) Filed: Jun. 18, 2004

(65) Prior Publication Data

US 2005/0282483 A1 Dec. 22, 2005

(51) Int. Cl.
*B60H 1/24* (2006.01)
*G01N 7/00* (2006.01)

(52) U.S. Cl. .................... 454/75; 454/139; 454/256; 165/249; 73/23.31; 324/464

(58) Field of Classification Search ............ 454/75, 454/139, 143, 256; 702/24; 165/249; 324/464; 73/23.31
See application file for complete search history.

(56) References Cited

U.S. PATENT DOCUMENTS

| | | | | |
|---|---|---|---|---|
| 4,437,391 A | | 3/1984 | Eguchi et al. | |
| 5,320,577 A | * | 6/1994 | Tooru et al. | 454/75 |
| 5,725,425 A | * | 3/1998 | Rump et al. | 454/75 |
| 5,946,923 A | | 9/1999 | Samukawa et al. | |
| 5,971,844 A | | 10/1999 | Samukawa et al. | |
| 6,151,952 A | * | 11/2000 | Mathews et al. | 73/23.31 |
| 6,496,009 B2 | | 12/2002 | Kataoka et al. | |
| 2001/0008374 A1 | | 7/2001 | Kataoka et al. | |
| 2002/0130053 A1 | * | 9/2002 | Ando et al. | 205/781 |
| 2002/0154019 A1 | * | 10/2002 | Kimoto et al. | 340/632 |
| 2003/0110828 A1 | * | 6/2003 | Kimoto et al. | 73/23.2 |

FOREIGN PATENT DOCUMENTS

| | | | |
|---|---|---|---|
| DE | 10111269 A1 | * | 9/2002 |
| JP | 1-134637 | | 5/1989 |
| JP | 11078485 A | * | 3/1999 |

* cited by examiner

*Primary Examiner*—Steven B McAllister
*Assistant Examiner*—Patrick F. O'Reilly, III
(74) *Attorney, Agent, or Firm*—Harness, Dickey & Pierce, PLC

(57) ABSTRACT

A method for controlling air intake into an air conditioned enclosure includes generating a plurality of sensor output voltages using a NOx sensor. A NOx voltage ratio is calculated from the sensor output voltages. A determination is made when the NOx voltage ratio one of equals and exceeds a NOx threshold. The NOx voltage ratio is reset to a unitary value for a predetermined length of time.

8 Claims, 5 Drawing Sheets

METHOD OF CONTROLLING AIR INTAKE INTO AIR CONDITIONED ENCLOSURE

FIELD OF THE INVENTION

The present invention relates in general to air systems for automobile vehicles and more specifically methods for controlling air intake into an automobile vehicle using signals from air quality sensors.

BACKGROUND OF THE INVENTION

Automobile vehicles commonly use one or more sensors to measure outside air quality. The output of these sensors can be used to adjust ventilation flow into and through the vehicle. For example, for automobile air conditioning systems, an air quality sensor system commonly includes two sensors which measure outside air quality, a combined hydrocarbon (HC)/carbon monoxide (CO) level sensor and a NOx level sensor (NOx gases include at least: nitric oxide, nitrogen dioxide and/or nitrous oxide). An air intake mode of an air conditioning system can be varied based on a voltage output of each of the air quality sensors.

The air intake mode commonly varies between a fresh air mode, where predominantly outside air is circulated through the vehicle, and a recirculation mode, where predominantly internal vehicle air is circulated. Fresh air mode is the normal operating mode and recirculation mode is generally limited in duration because recirculation mode can produce window fogging from increasing humidity. When the sensed outside air quality reaches a predetermined threshold level of HC, CO and/or NOx gas(es), the intake mode is temporarily switched from fresh air mode to recirculation mode. The mode should later switch back to fresh air mode when the level of HC or CO gases (hereinafter collectively referred to as H/C gas) and/or NOx gas(es) crosses below the predetermined threshold level. For common H/C gas sensors, the sensor voltage output drops when sensed HC and/or CO gas concentration(s) increase(s). When a rate of change of the output voltage reaches or exceeds a threshold value, a program associated with an air conditioning (A/C) panel interprets the voltage rate change as an air quality event and signals an intake mode change. The mode change is commonly accomplished by switching an air valve or air intake door position. Common NOx sensors operate in an opposite fashion to H/C sensors in that NOx sensor voltage output increases with increasing NOx gas concentration. A rate of change of the output voltage of the NOx sensor which exceeds a threshold value is similarly used by the air conditioning (A/C) panel to trigger a mode change.

Common NOx sensors can trigger improper inlet air mode changes because common NOx sensors are highly sensitive to deoxidized gases such as high molecular weight H/C gases. Unlike the voltage output when a NOx gas is sensed, when certain H/C gases are present and sensed by the NOx sensor, the voltage level of the NOx sensor undesirably drops. Thereafter, when the H/C level sensed by the NOx sensor returns to normal, NOx sensor output voltage correspondingly increases, falsely signaling a NOx voltage rate change to the A/C panel. Improper mode change of the air system can result or the system can be held in recirculation mode for overly extensive time periods resulting in interior window fogging or passenger discomfort.

SUMMARY OF THE INVENTION

According to a preferred embodiment of the present invention, a method for controlling air intake into an air conditioned enclosure includes monitoring a change in hydrocarbon and NOx gases outside of an air conditioned enclosure. For each gas type, changes in the gas concentrations are monitored by the sensor and a change ratio is calculated in each case by dividing a current concentration value of the measured gas by a baseline value of the gas.

According to another aspect of the present invention, a method for controlling air intake state can be derived from the change ratio calculations. For H/C gases, sensor reactions generate a drop in sensor output voltage, which consequently creates a reduction in change ratio. Calibrated threshold value(s) can be selected for the system to correspond to desired changing points in air quality levels. For H/C gases, changes in inlet state (recirculation) are typically made when the change ratio is reduced to levels below that of the threshold. For NOx gases, the concept is similar but opposite in direction. NOx gases result in an increase in sensor voltage when present in higher concentrations, thus creating higher change ratios. For NOx gases, recirculation results from having change ratios above the calibrated threshold value.

According to yet another aspect of the present invention, a method for controlling air intake into an air conditioned enclosure includes creating an H/C sensor output voltage from the H/C sensor. A NOx sensor output voltage is created by the NOx sensor. The ventilation system is controlled based on each of an H/C voltage ratio and a NOx voltage ratio. The NOx voltage ratio is reset to a baseline value for a predetermined time period.

An important aspect of the invention involves a method to cope with an undesirable element of the basic sensor technology. Typically, the NOx sensing element has some reactivity to H/C type gases. This cross sensitivity results in the NOx sensor having a decreased voltage output in the presence of some H/C gases. Since the NOx sensor typically increases its output in the presence of NOx gases, the cross sensitivity of the sensing element to H/C results in an apparent condition of "dirty" air once the original H/C event starts to subside. In other words, once the NOx sensor begins to clear itself of H/C gas (and output voltage increases), the NOx sensor begins to indicate a false air quality event through the same increased voltage. The present invention provides a method of eliminating the effects of this cross-sensitivity.

An air intake system of the present invention offers several advantages. The impact of sensor cross-sensitivity is eliminated by a detailed algorithm that uses both H/C and NOx sensor inputs to determine the likelihood of a false NOx event, caused by the impact of H/C gas on the NOx sensor. Once such an event is recognized, the NOx change ratio value is reset until proper operating conditions are restored. By resetting a NOx sensor output voltage signal ratio to a null or baseline value for a predetermined period of time, perturbations in the output voltage signals from the NOx sensor can be eliminated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
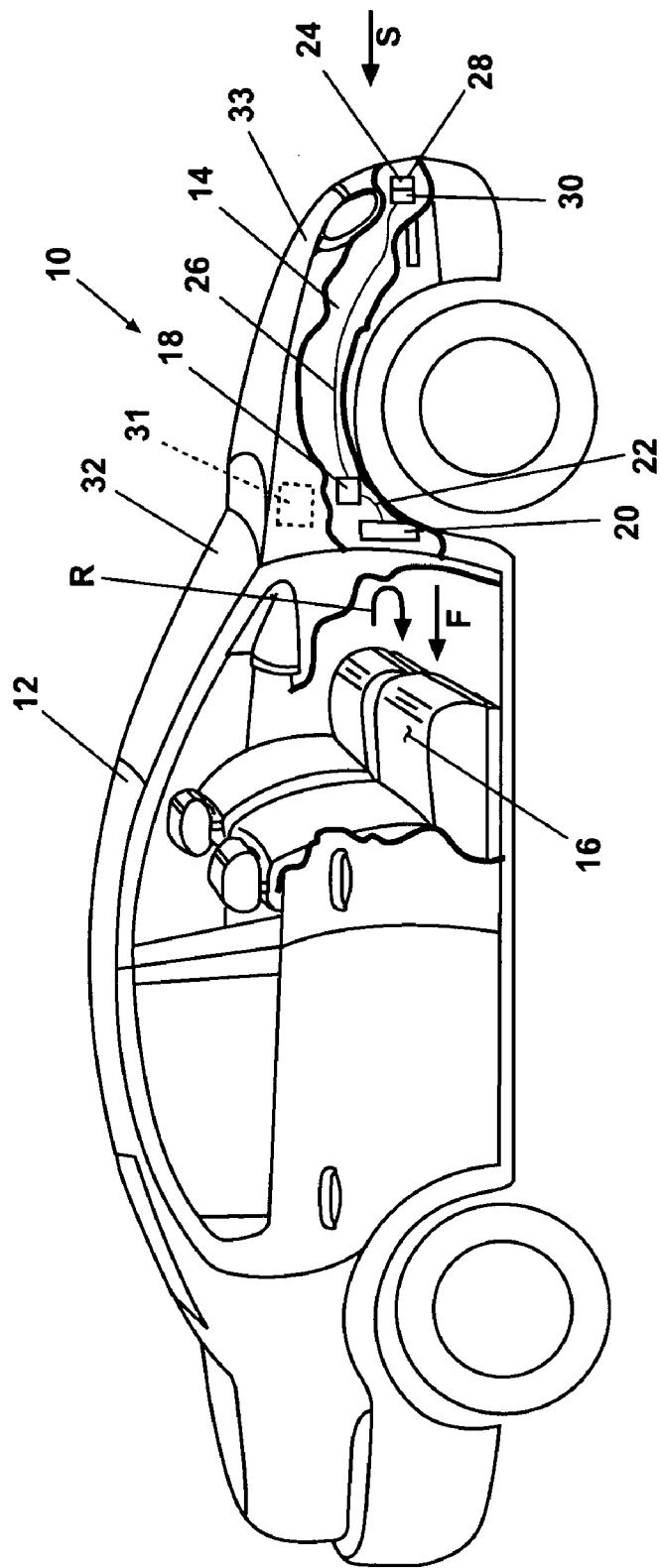
FIG. 1 is a partially sectioned perspective view of an automobile vehicle incorporating the method of controlling air intake into an air conditioned enclosure of the present invention.

According to a preferred embodiment of the present invention and referring generally to FIG. 1, an air intake system 10 is installed on a vehicle 12 generally within an engine compartment 14. Air intake system 10 provides air flow to a passenger cabin 16. Air flow within passenger cabin 16 can be in either a fresh air mode flow "F" or a recirculation or recycle mode flow "R". Air flow within passenger cabin 16 is controlled by a ventilation system controller 18 which signals the position for a ventilation intake door 20 which is electronically controlled by ventilation system controller 18 via control wiring 22.

An air quality sensor 24 is normally positioned near a forward end of vehicle 12 adjacent to a grill area and positioned in the flow path of an outside air source "S" as air source "S" enters engine compartment 14. Electrical signals from air quality sensor 24 are conveyed via sensor wiring 26 to ventilation system controller 18. In one aspect of the invention air quality sensor 24 includes a NOx sensor 28 and a hydrocarbon/carbon monoxide (H/C) sensor 30. Both NOx sensor 28 and H/C sensor 30 produce output electrical voltage signals when they sense NOx or H/C gases. These output voltage signals are received by ventilation system controller 18 which if necessary signals a position change for ventilation intake door 20.

NOx sensor 28 measures an overall level of NOx gas including any one or all of an NO, an $NO_2$, and/or a $N_2O$ gas. A voltage output from NOx sensor 28 normally increases with increasing NOx gas concentration and decreases with decreasing NOx gas concentration. Contrary to the voltage output of NOx sensor 28, H/C sensor 30 output voltage normally decreases when H/C sensor 30 detects an increasing concentration of either a hydrocarbon, a carbon monoxide and/or carbon dioxide gas.

As shown in FIG. 1, air quality sensor 24 can also be positioned at a sensor alternate location 31. Sensor alternate location 31 is adjacent an intersection between a windshield 32 and a hood 33 of vehicle 12. This location is commonly used for air intake into vehicle 12. The invention is not limited to a specific location for air quality sensor 24 and the locations identified herein are therefore exemplary.

Figure 2:
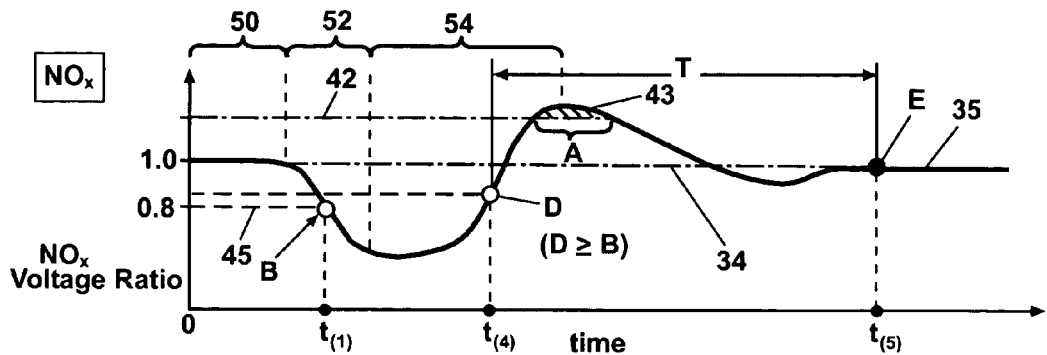
FIG. 2 is a graph of NOx ratio versus time identifying a potential over shoot condition resulting from hydrocarbon presence sensed by a NOx sensor.
Figure 3:
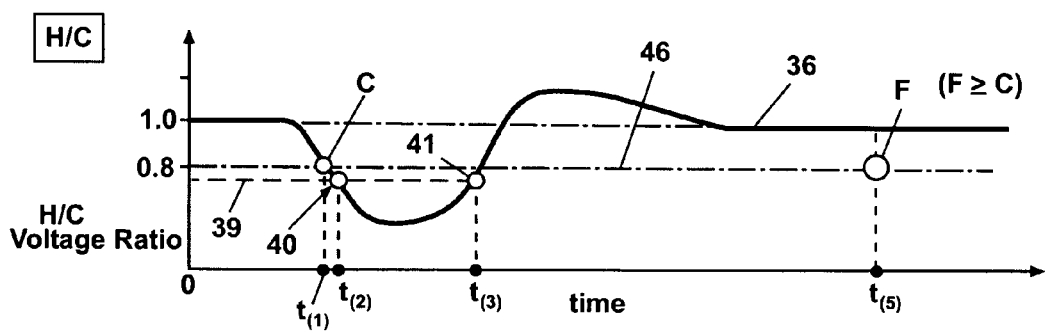
FIG. 3 is a graph similar to FIG. 2 identifying a hydrocarbon/carbon monoxide sensor ratio versus time.
Figure 4:
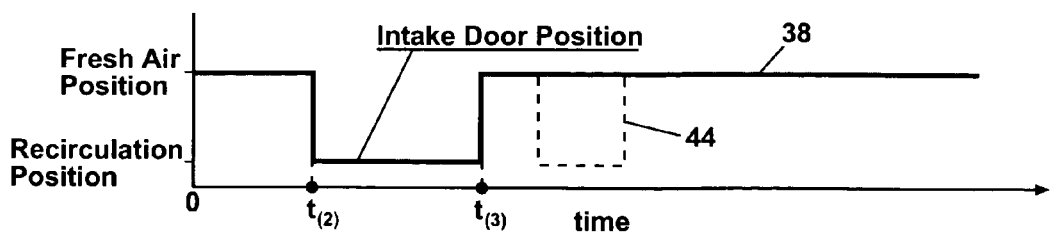
FIG. 4 is a graph identifying a vehicle intake door position versus time varying between a fresh air position and a recirculation (recycle) position for various NOx ratio and hydrocarbon/carbon monoxide ratios provided in FIGS. 2 and 3.

Referring generally to FIGS. 2-4, graphs are provided for each of a NOx sensor voltage ratio, an H/C sensor voltage ratio and a ventilation system intake door position varying over time. A common NOx sensor output voltage overshoot condition is identified which is correctable by the air intake system 10 of the present invention.

In FIG. 2, an exemplary NOx sensor output voltage ratio (OVR) is plotted against time. The NOx sensor OVR is established by continuously comparing a present or current NOx sensor output voltage, NOx (now) to the last or previously measured NOx sensor output voltage as a baseline value, NOx (prev) using the following equation:

$$\left[\frac{NOx(now)}{NOx(prev)} = NOx \text{ ratio}\right] \quad \text{Equation 1}$$

In a preferred embodiment, NOx (prev) is an average of the previously measured NOx sensor output voltages occurring over the preceding 300 second time period. The 300 second time period or time constant can be varied at the discretion of the designer and provides a baseline value of NOx previously measured voltages for comparison purposes. A unitary value 34 representing a NOx sensor OVR of 1.0 is established when the present NOx sensor output voltage equals the baseline or previously measured NOx sensor output voltage. The baseline can also be a calculated value, an estimated value, or similarly developed value.

FIG. 2 identifies an exemplary undesirable situation wherein NOx sensor 28 output voltage drops (NOx now<NOx prev) when NOx sensor 28 senses a high molecular weight H/C gas. Examples of high molecular weight H/C gases include benzene or similar aromatic gases and/or undecane. During these time periods, the output voltage of NOx sensor 28 generally follows a NOx OVR curve 35.

FIG. 3 identifies an H/C OVR curve 36 of H/C sensor 30 during the same time period described in FIG. 2. An exemplary H/C sensor output voltage ratio (OVR) is plotted against time. The H/C sensor OVR is established by continuously comparing a present or current H/C sensor output voltage, H/C (now) to the last or previously measured H/C sensor output voltage H/C (prev), computed using an exemplary 300 second time constant similar to NOx (prev), using the following equation:

$$\left[\frac{H/C(now)}{H/C(prev)} = H/C \text{ ratio}\right] \quad \text{Equation 2}$$

Also over this same time period, FIG. 4 provides the exemplary position of ventilation intake door 20 indicated by an intake door position status curve 38. For FIGS. 2-4, it is assumed at time zero that the NOx sensor OVR equals 1.0, the H/C sensor OVR equals 1.0, and ventilation intake door 20 is positioned for fresh air intake.

Under normal operating conditions, a hydrocarbon gas sensed by H/C sensor 30 would result in an output voltage ratio plotted as H/C OVR curve 36. At a predetermined low H/C threshold 39, in the example shown in FIG. 3 as threshold point 40 occurring at time $t_2$, intake door 20 is normally signaled to change from the fresh air position to the recirculation position. The recirculation position is maintained until at least a time $t_3$ when low H/C threshold 39 is crossed again at a recovery threshold point 41.

The NOx sensor signal is also used to signal a change from fresh air position to the recirculation position of intake door 20. In the undesirable event that a high molecular weight hydrocarbon gas is sensed by NOx sensor 28, the subsequent NOx OVR will initially drop below 1.0 as shown by NOx OVR curve 35 in FIG. 2 and follow a typical recovery path as shown. It is desirable that a value of NOx OVR curve 35 not exceed a high NOx threshold 42. High NOx threshold 42 is predefined by the vehicle designer for normal operation of air intake system 10 as the threshold of sensed NOx gas which triggers a change in position of ventilation intake door 20 from the fresh air position to the recycle position. Because NOx OVR curve 35 represents a continuously calculated NOx sensor output voltage varying over time, a temporary NOx over-shoot period 43 can occur, particularly if both a NOx gas and a high molecular weight hydrocarbon gas are sensed by NOx sensor 28. In other words, the influence of H/C gas on the NOx sensor first produces a decrease in NOx OVR followed by an increase and overshoot of NOx OVR as the system recovers. During a time period "A", the high molecular weight gas concentration sensed by NOx sensor 28 produces an erroneously high value of NOx OVR curve 35, which if not corrected would result in ventilation intake door 20 being switched to or undesirably retained in the recirculation position. This is identified as a NOx event 44 shown in FIG. 4, having a duration corresponding to time period "A". It is undesirable to reposition ventilation intake door 20 to the recirculation position as a result of NOx event 44 because the high NOx threshold 42 is exceeded by an undesirable rate of change of the output voltage of NOx sensor 28 caused by the presence of H/C gas rather than by a high concentration of NOx gas.

To prevent the occurrence of NOx event 44, air intake system 10 uses an algorithm. The algorithm of air intake system 10 includes a "Stand-By" mode. The "Stand-By" mode begins when two events occur at the same time. When NOx OVR curve 35 reaches a first standby threshold 45, in this example at threshold point "B", and at a time when H/C OVR curve 36 reaches a second standby threshold 46, in this example at threshold point "C", the system enters the "Stand-By" mode. First standby threshold 45 and second standby threshold 46 are predetermined values, in one aspect both having a value of 0.8. These values can be equivalent or different at the discretion of the system designer. In this example the "Stand-By" mode starts when threshold points "B" and "C" occur together at a time t1. Once in the "Stand-By" mode, the algorithm then determines when a value of the NOx OVR again equals or exceeds first standby threshold 45, in this example at a NOx recovery threshold point "D" (D>=B) at a time t4. These previously mentioned threshold values can occur at different times, vary in value, and vary from each other (are calibratable) based on the design criteria for vehicle 12.

As previously noted and as shown in FIG. 4, the recirculation position for ventilation intake door 20 is maintained in the recirculation position until the H/C sensor OVR reaches the H/C recovery threshold point 41 (at time $t_3$). Once the H/C OVR passes recovery threshold point 41 at time $t_3$, the vehicle A/C system should return to fresh air intake mode. However, as a result of the influence of certain H/C gases on the NOx sensor, the NOx OVR begins to increase as the concentration of H/C gases decreases. From the perspective of NOx sensor 28, the increase of NOx OVR represents the presence of "dirty" air even though the air is showing decreasing concentrations of H/C gas.

To prevent incorrectly positioning ventilation intake door 20 due to NOx event 44, air intake system 10 provides a temporary over-ride of the output voltage ratio of NOx sensor 28. If the system is in "Stand-By" mode, starting at approximately NOx recovery threshold point "D" and extending for a predetermined time period "T", the value of the NOx sensor OVR is set or reset to a value of 1.0. In one preferred embodiment of the present invention, time period "T" is approximately 120 seconds. During time period "T", the NOx over-shoot period 43 is masked until NOx OVR curve 35 returns to its unitary value of 1.0. By masking NOx over-shoot period 43, NOx event 44 is precluded, thereby maintaining the position of ventilation intake door 20 in the fresh air position. Time period "T" represents a predetermined value providing a sufficient period for NOx OVR curve 35 to return normally to a value of 1.0. This occurs at approximately a time point "E" at a time $t_5$. It should be obvious to the skilled practitioner that time period "T" can vary depending upon the design conditions for vehicle 12.

Because NOx sensor 28 is susceptible to fluctuations due to the presence of high molecular weight H/C gases in addition to the presence of NOx gases, the output of the relatively more stable H/C sensor 30 is used in conjunction with the output of NOx sensor 28 to help establish time period "T". To establish time point "E", an H/C sensor output stability point "F", occurring approximately at time $t_5$ is used, wherein in one preferred embodiment the H/C sensor OVR is greater than or equal to the H/C OVR at H/C threshold point "C". This reduces the effect of perturbations in NOx OVR curve 35. H/C sensor output stability point "F" can be any preselected value at the discretion of the system designer.

Figure 5:
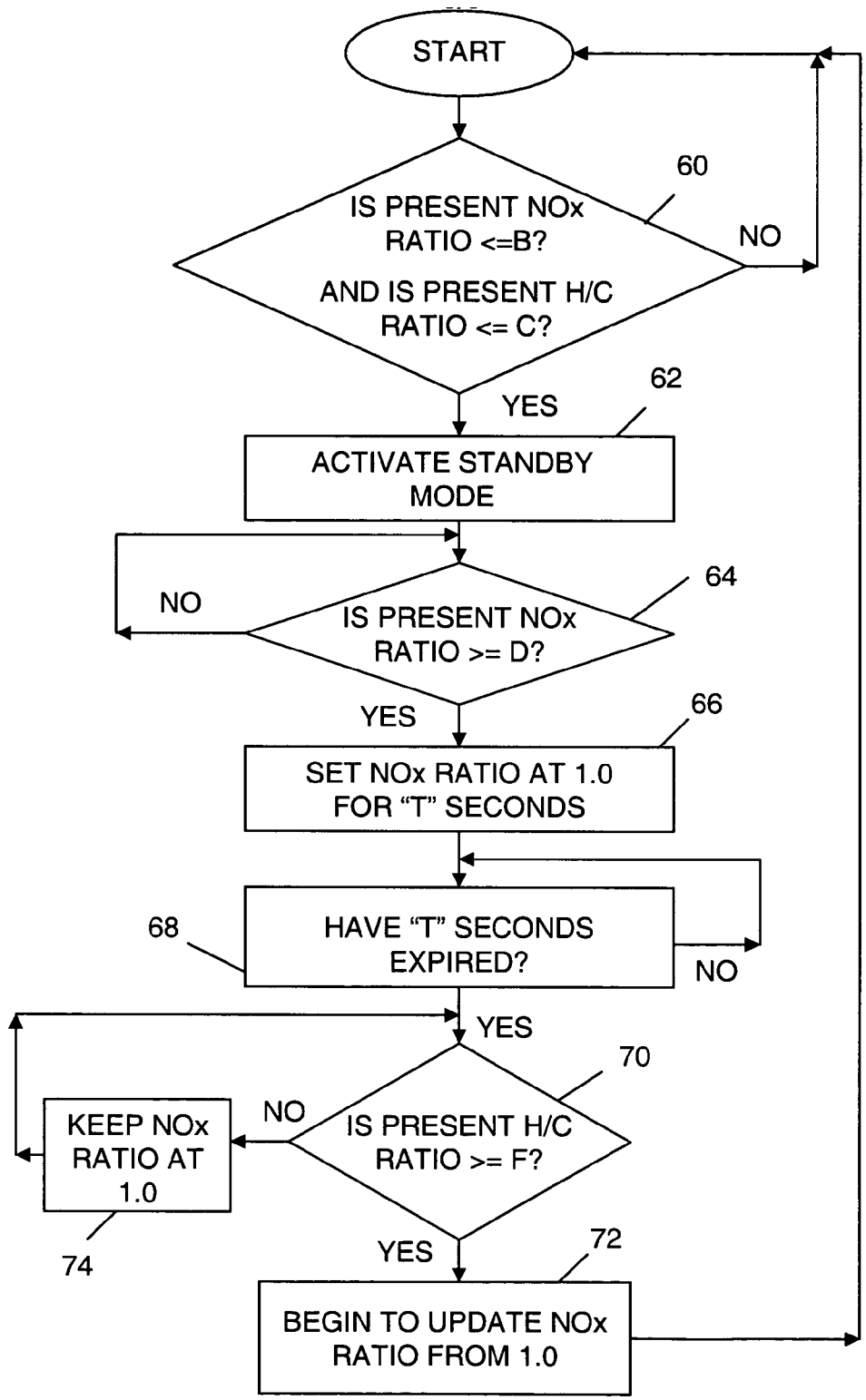
FIG. 5 is a flow diagram for the operating steps of an air intake system of the present invention.

Referring generally to FIG. 5, exemplary steps followed by air intake system 10 of the present invention are described. FIG. 5 describes a program which runs in parallel with one or more existing or common control programs used to control the position of ventilation intake door 20. At a starting condition both the NOx sensor OVR and the H/C sensor OVR are assumed to be equivalent to 1.0. In a comparison step 60, both the NOx sensor OVR and the H/C sensor OVR are compared to various threshold points. The present or current NOx sensor OVR is compared to the NOx predefined threshold point "B" to determine if the present NOx sensor OVR is less than or equal to the predefined threshold point "B". The present H/C sensor OVR is compared to the H/C predefined threshold point "C" to determine if the H/C sensor OVR is either less than or equal to the H/C predefined threshold point "C". If both conditions of the NOx sensor OVR being less than or equal to threshold point "B" and the H/C sensor OVR being less than or equal to threshold point "C" are not simultaneously met, the program returns to start. If both conditions are met, that is the NOx sensor OVR is either less than or equal to threshold point "B" and the H/C sensor OVR is less than or equal to threshold point "C", then in an operating step 62 the air intake system is signaled to operate in Stand-By mode. When in Stand-By mode, in a comparing step 64, the present NOx sensor OVR is then compared to the NOx recovery threshold point "D". If the present NOx sensor OVR is less than the NOx recovery threshold point "D" the program repeats step 64. If the present NOx sensor OVR is either greater than or equal to the NOx recovery threshold point "D" the program next performs a setting step 66. In setting step 66, the NOx sensor OVR is set at a value of 1.0 for a period of "T" seconds. Following setting step 66, in a time querying step 68, the program continuously queries whether the time period of "T" seconds has expired. If the time period of "T" seconds has not expired, the program repeats querying step 68. When the time period of "T" seconds has expired, a comparing step 70 is performed. In comparing step 70, the present H/C sensor OVR is compared to H/C sensor output stability point "F". If the present H/C sensor OVR is either greater than or equal to H/C sensor output stability point "F" an updating step 72 is performed. In updating step 72 the program begins to update the NOx sensor OVR starting at its current value of 1.0 and the program returns to the start point. If the present H/C sensor OVR is not greater than or equal to H/C sensor output stability point "F", a maintaining step 74 is performed. In maintaining step 74, the NOx sensor OVR is maintained at a value of 1.0 and the program returns to step 70.

Referring back to FIG. 2, various segments of NOx OVR curve 35 are defined. In a first segment 50 of NOx OVR curve 35, at each point in time, a NOx sensor present output voltage divided by a NOx sensor previous output voltage is unchanging therefore the NOx sensor OVR equals 1.0. In a second segment 52, the rate of change of NOx OVR curve 35 is negative. The value at each point of NOx OVR curve 35 is less than 1.0 because each successive NOx present output voltage is less than a NOx sensor previous output voltage. In a third segment 54, the value at each point of NOx OVR curve 35 is greater than 1.0 because each successive NOx sensor present output voltage is greater than the previous value of the NOx sensor output voltage. Because of the high sensitivity of NOx sensor 28 to non-NOx gases, perturbations in NOx OVR curve 35 occur to a greater extent than with corresponding H/C OVR curve 36 of H/C sensor 30. H/C OVR curve 36 is therefore used to identify an H/C sensor output stability point "F". When H/C OVR curve 36 has flattened out and is greater than or equal to the H/C predefined threshold point (F≧C), perturbations in NOx OVR curve 35 are effectively reduced to zero.

Figure 6:
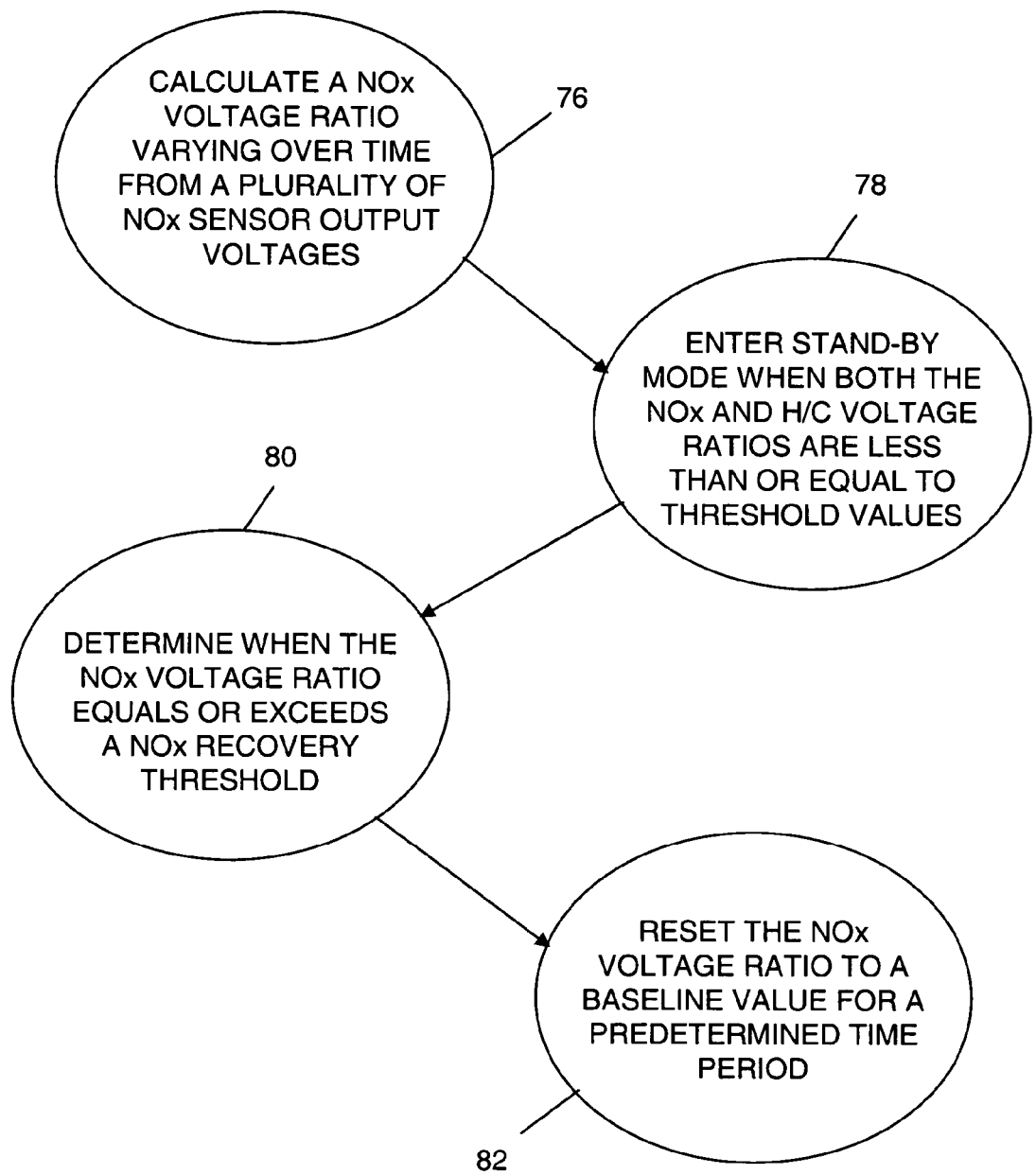
FIG. 6 is a simplified flow diagram of the NOx sensor output voltage sensing and control steps utilized by an air intake system of the present invention.

According to another aspect of the present invention and referring generally to FIG. 6, in a calculating step 76, a NOx sensor output voltage ratio is calculated with respect to time from a plurality of successive NOx sensor output voltages. In a comparison step 78, when both the NOx and H/C voltage ratios reach predetermined threshold values, the system enters a Stand-By mode. In a determining step 80, a determination is made when the NOx sensor output voltage ratio equals or exceeds a NOx recovery threshold. In a resetting step 82, the NOx sensor output voltage ratio is reset to a baseline value for a predetermined time period. FIG. 6 identifies the steps required to calculate and use a NOx sensor output voltage ratio to control a ventilation system of an automotive vehicle according to the present invention.

Figure 7:
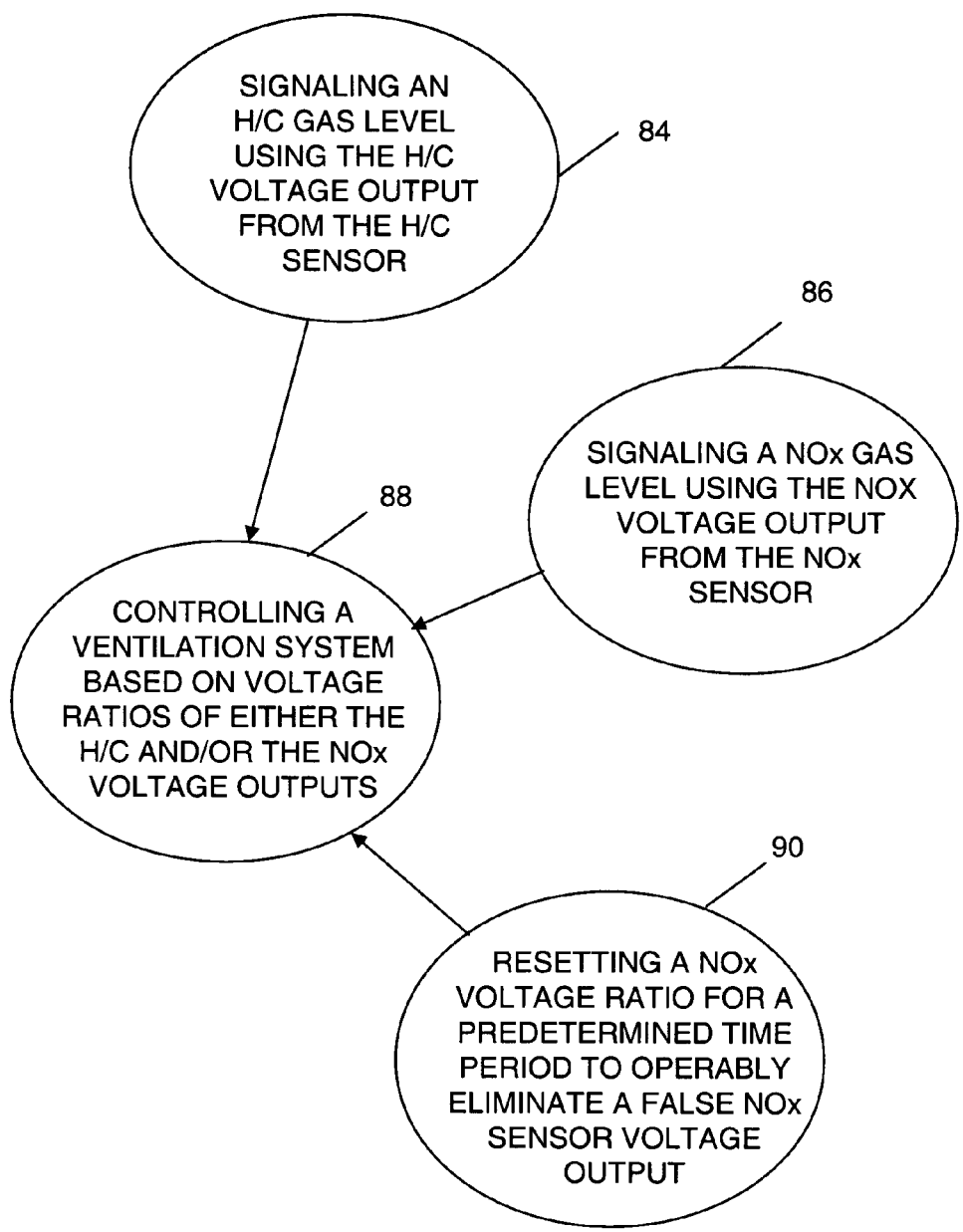
FIG. 7 is a flow diagram of the parallel steps utilized by an air intake system of the present invention prior to control of an automobile vehicle ventilation system.

According to still another aspect of the present invention and referring generally to FIG. 7, in a signaling step 84, an H/C gas level signal is created using an H/C sensor output voltage. In a parallel signaling step 86, a NOx gas level signal is created using a NOx sensor output voltage. In a controlling step 88, a ventilation system is controlled based on voltage ratios of each of the H/C and NOx sensor output voltages created in signaling steps 84 and 86 respectively. In a resetting step 90, a NOx sensor output voltage ratio is reset for a predetermined time period to operably eliminate a false NOx sensor voltage output.

An air intake system 10 of the present invention offers several advantages. An output voltage generated by a NOx sensor when a high molecular weight hydrocarbon gas is sensed can be masked from a control signal used for an automobile vehicle ventilation control system. By resetting the NOx sensor output voltage signal ratio to a null or unitary value for a predetermined period of time, perturbations in the output voltage signals from the NOx sensor can be eliminated. By selectively masking certain NOx sensor output voltage signals, the automobile air intake system can eliminate undesirable recirculation mode operating periods otherwise directed when the NOx sensor senses high molecular weight hydrocarbon gases instead of or in addition to NOx gases.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling air intake into an air conditioned enclosure, comprising:
    detecting a change in NOx gas outside of an air conditioned enclosure, where the change in NOx gas is determined in relation to a baseline value of NOx gas;
    detecting an event independent from the change in NOx gas which lowers the baseline value of NOx gas, wherein detecting the event which lowers the baseline value further comprises monitoring hydrocarbon gas outside of the enclosure and correlating the event with a change in hydrocarbon gas outside of the enclosure;
    correlating the baseline value of NOx gas with a measured value of NOx gas based on upon completion of said event; and
    determining a change ratio of hydrocarbon gas by dividing a value of hydrocarbon gas recently measured outside of the enclosure by a baseline value of hydrocarbon gas and comparing the change ratio to a threshold value, such that the event occurs when the change ratio is lower than the threshold value.

2. The method of claim 1, further comprising controlling intake of air from outside of the enclosure based in part on the change in NOx gas outside the enclosure.

3. The method of claim 1, wherein detecting the change in NOx gas further comprises:
    determining a change ratio by dividing a value of NOx gas recently measured outside of the enclosure by the baseline value of NOx gas; and
    comparing the change ratio to a threshold value.

4. The method of claim 1, comprising establishing the baseline value of NOx gas based on values of NOx gas measured outside of the enclosure and averaged over a time period.

5. The method of claim 1, wherein correlating the baseline value of NOx gas with a measured value of NOx gas occurs when the change ratio of hydrocarbon gas exceeds a second threshold value.

6. The method of claim 1, wherein correlating the baseline value of NOx gas with a measured value of NOx gas occurs upon expiration of a predefined time period.

7. The method of claim 1, wherein correlating the baseline value of NOx gas with a measured value of NOx gas occurs when the change ratio of hydrocarbon gas exceeds a second threshold value and upon expiration of a predefined time period.

8. The method of claim 1, wherein correlating the baseline value further comprises setting the baseline value of NOx gas equal to a value of NOx gas measured outside of the enclosure proximate to the completion of the event.

* * * * *